(12) United States Patent
P

(10) Patent No.: US 11,341,192 B2
(45) Date of Patent: May 24, 2022

(54) CROSS PLATFORM COLLABORATIVE DOCUMENT MANAGEMENT SYSTEM

(71) Applicant: SAP SE, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 16/774,561

(22) Filed: Jan. 28, 2020

(65) Prior Publication Data

US 2021/0232639 A1    Jul. 29, 2021

(51) Int. Cl.
*G06F 16/93* (2019.01)
*H04L 9/06* (2006.01)
*G06F 40/103* (2020.01)
*G06F 9/50* (2006.01)
*G06N 20/00* (2019.01)
*G06F 21/60* (2013.01)

(52) U.S. Cl.
CPC .............. *G06F 16/93* (2019.01); *G06F 9/505* (2013.01); *G06F 21/602* (2013.01); *G06F 40/103* (2020.01); *G06N 20/00* (2019.01); *H04L 9/0637* (2013.01)

(58) Field of Classification Search
CPC .......... G06F 21/60; G06F 16/93; G06F 16/27; G06V 20/00
See application file for complete search history.

(56) References Cited

U.S. PATENT DOCUMENTS

2020/0019421 A1* 1/2020 Sun ........................ H04L 9/3239
2020/0117611 A1* 4/2020 Li ........................ G06F 9/45533

* cited by examiner

*Primary Examiner* — Hau H Hoang
(74) *Attorney, Agent, or Firm* — Mintz Levin Cohn Ferris Glovsky and Popeo, P.C.

(57) ABSTRACT

A method may include receiving, from a first document management system, a first request to store a document in a blockchain enabled data store including multiple blockchain platforms. In response to the first request, the document may be converted from a first format associated with the document management system to a portable binary code format (e.g., WebAssembly format) before being sent to one of the blockchain platforms. A second request to access the document may be received from a second document management system. In response to the second request, the document in the portable binary code format may be retrieved from the blockchain platform, converted to a second to a second format associated with the second document management system, and sent to the second document management system. Related systems and articles of manufacture are also provided.

19 Claims, 21 Drawing Sheets

CROSS PLATFORM COLLABORATIVE DOCUMENT MANAGEMENT SYSTEM

TECHNICAL FIELD

The subject matter described herein relates generally to document management and more specifically to a cross platform framework integrating blockchain enabled storage across multiple document management systems.

BACKGROUND

A blockchain may refer to a list of cryptographically linked records called block. The blockchain may implement a distributed ledger, which may be a consensus of replicated, shared, and synchronized digital data without a central administrator or centralized data storage. Instead, a synchronized copy of the distributed ledger may be held across various nodes of a peer-to-peer network operating in accordance to a consensus algorithm. For example, a majority of the nodes in the peer-to-peer network may be required to achieve a consensus before a new block may be added to each copy of the distributed ledger. Each block in the blockchain may include a cryptographic hash of a preceding hash such that modifying any block in the blockchain may require modifying all subsequent blocks in the blockchain. As such, adding a block to the blockchain may render the data included in the block immutable.

SUMMARY

Systems, methods, and articles of manufacture, including computer program products, are provided for a cross platform collaborative document management. In one aspect, there is provided a system that includes at least one data processor and at least one memory. The at least one memory may store instructions that result in operations when executed by the at least one data processor. The operations may include: receiving, from a first document management system, a first request to store a document in a blockchain enabled data store including a plurality of blockchain platforms; responding to the first request by at least converting the document from a first format associated with the first document management system to a portable binary code format and sending the document in the portable binary code format to one of the plurality of blockchain platforms; receiving, from a second document management system, a second request to access the document stored in the blockchain enabled data store; and responding to the second request by at least retrieving, from the one of the plurality of blockchain platforms, the document in the portable binary code format, converting the document from the portable binary code format to a second format associated with the second document management system, and sending the document in the second format to the second document management system.

In some variations, one or more features disclosed herein including the following features may optionally be included in any feasible combination. The first format and the second format may include Intermediate Document, extensible markup language, JavaScript Object Notation, Flat Files, or Parquet.

In some variations, the one of the plurality of blockchain platforms may be identified based at least on the document. The one of the plurality of platforms being identified by applying a machine learning model trained to identify a blockchain platform corresponding to the document. The machine learning model may be a clustering algorithm.

In some variations, a third request to access the document stored in the blockchain enabled data store may be received. Whether the third request has obtained a token associated with the document may be determined in response to the third request. The execution of the third request may be delayed in response to determining that the second request has obtained the token associated with the document.

In some variations, the document in the portable binary code format from the one of the plurality of blockchain platforms based at least on a likelihood of a third request requesting to access the document. The likelihood of a third request requesting to access the document may be determined by applying a machine learning model trained to predict, based at least on a historical access log associated with the document, when to retrieve the document from the one of the plurality of blockchain platforms. The machine learning model may be a long short term memory network.

In some variations, the document in the portable binary code format may be encrypted prior to sending the document to the one of the plurality of blockchain platforms.

In some variations, the document in the second format may be encrypted prior to sending the document in the second format to the second document management system.

In some variations, the conversion to and/or from the portable binary code format may be performed by a blockchain as a service layer configured to provide in-network processing by at least communicating with a network interface controller and/or a field programmable gate array.

In some variations, responding to the first request and the second request may include determining a data priority and a network bandwidth priority for each of the first request and the second request.

In some variations, the first request and/or the second request may be assigned to a first batch. The first batch may be assigned to a first queue. A first processing thread may process the first queue including the first batch, the first processing thread processing the first queue by at least responding to the first request and/or the second request included in the first batch. The first batch is assigned to the first queue based at least on a first priority associated with the first request and/or the second. A second batch may be assigned to a second queue based at least on a second priority associated with a third request included in the second batch. A second processing thread may process the second queue including the third batch. The first processing thread may process the first queue and the second processing thread may process the second thread in parallel.

In some variations, a second queue for processing the first batch may be allocated from a pool of free queues in response to determining that the first batch is associated with insufficient resources for processing the first batch. One or more resources may be allocated for the second queue. The one or more resources may include a memory, a processing unit, and/or a thread.

In some variations, the portable binary code format may be a WebAssembly format.

In another aspect, there is provided a method for a cross platform collaborative document management system. The method may include: receiving, from a first document management system, a first request to store a document in a blockchain enabled data store including a plurality of blockchain platforms; responding to the first request by at least converting the document from a first format associated with the first document management system to a portable binary code format and sending the document in the portable binary code format to one of the plurality of blockchain platforms; receiving, from a second document management system, a second request to access the document stored in the blockchain enabled data store; and responding to the second request by at least retrieving, from the one of the plurality of blockchain platforms, the document in the portable binary code format, converting the document from the portable binary code format to a second format associated with the second document management system, and sending the document in the second format to the second document management system.

In another aspect, there is provided a computer program product that includes a non-transitory computer readable storage medium. The non-transitory computer-readable storage medium may include program code that causes operations when executed by at least one data processor. The operations may include: receiving, from a first document management system, a first request to store a document in a blockchain enabled data store including a plurality of blockchain platforms; responding to the first request by at least converting the document from a first format associated with the first document management system to a portable binary code format and sending the document in the portable binary code format to one of the plurality of blockchain platforms; receiving, from a second document management system, a second request to access the document stored in the blockchain enabled data store; and responding to the second request by at least retrieving, from the one of the plurality of blockchain platforms, the document in the portable binary code format, converting the document from the portable binary code format to a second format associated with the second document management system, and sending the document in the second format to the second document management system.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to cross platform document management, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Storing a document as a block in a blockchain may require the document to be validated by a majority of nodes in a peer-to-peer network. Moreover, once the document is validated by the majority of nodes in the peer-to-peer network, adding the document as a block in the blockchain may render the document immutable. As such, storing the document as a block in the blockchain may confirm the authenticity of the document as well protect the document from subsequent tampering. Nevertheless, integrating a document management system with blockchain enabled document storage may be challenging, especially if users from different document management systems are required to collaborate on the same documents before the documents are stored to the blockchain. Moreover, the blockchain enabled document storage may include a variety of blockchain platforms (e.g., Multichain, HyperLedger, Quorum, Ethereum, and/or the like). Different blockchain platforms may impose different access protocols, further complicating collaboration across document management systems.

As such, in some example embodiments, a machine learning based framework may be configured to integrate blockchain enabled storage across multiple document management systems such that a first user associated with a first document management system may collaborate with a second user associated with a second document management system to generate and/or modify a document for storage as a block in the blockchain. For example, the machine learning based framework may include a WebAssembly (WASM) based interface for communicating with the different blockchain nodes in the blockchain network. In doing so, the machine learning based framework may interface with the blockchain enabled document storage, including the various blockchain platforms included in the blockchain enabled document storage, such that the blockchain enabled document storage may be accessible to a user as a remote service.

Figure 1:
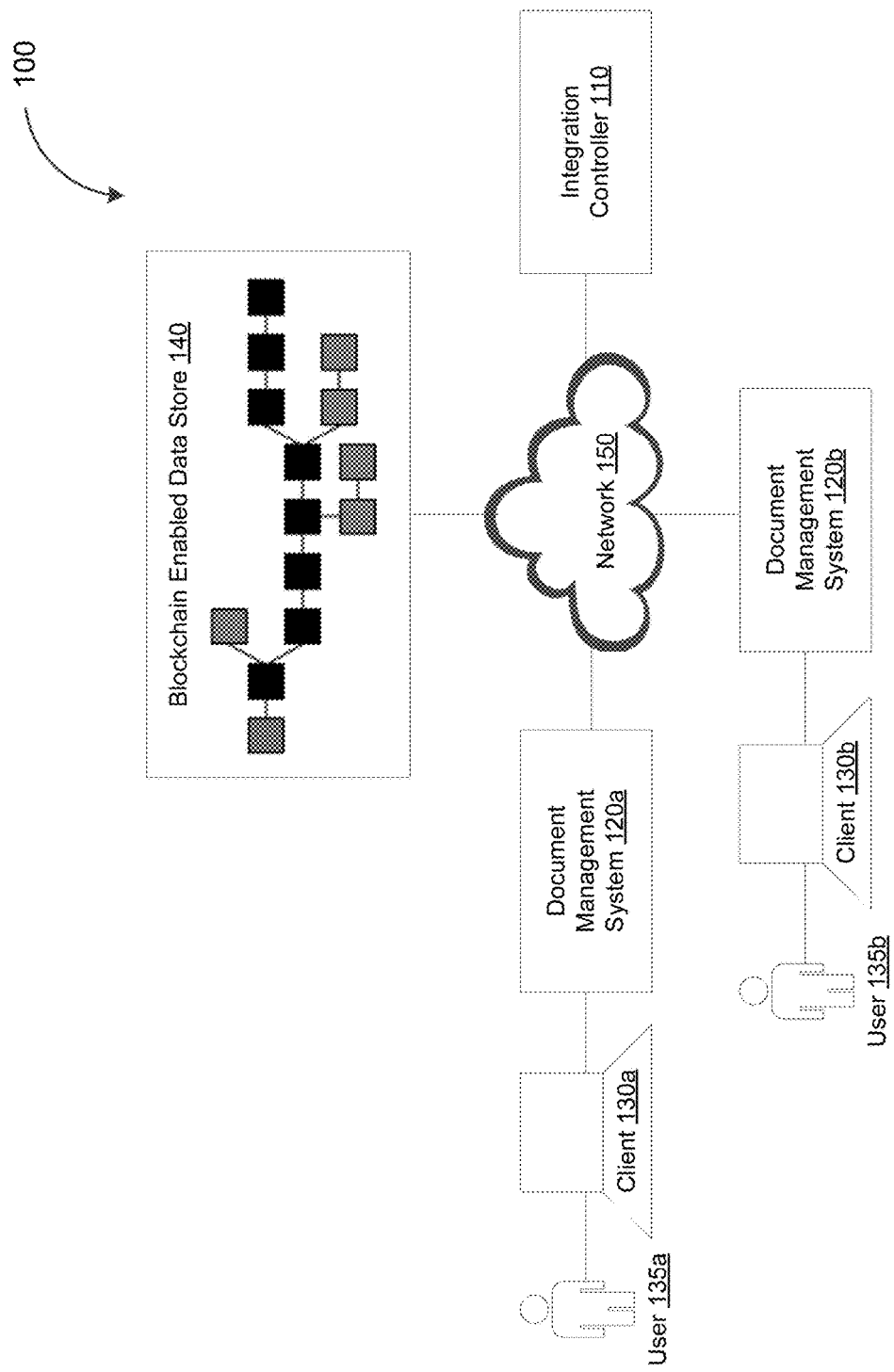
FIG. 1 depicts a system diagram illustrating an example of a cross platform document management system, in accordance with some example embodiments.

FIG. 1 depicts a system diagram illustrating a cross-platform document collaboration system 100, in accordance with some example embodiments. Referring to FIG. 1, the cross-platform document collaboration system 100 may include an integration controller engine 110, a first document management system 120a, a second document management system 120b, a first client 130a, a second client 130b, and a blockchain enabled data store 140. As shown in FIG. 1, the integration controller 110, the first document management system 120a, the second document management system 120b, and the blockchain enabled data store 140 may be communicatively coupled via a network 150. The first client 130a and the second client 130b may be processor-based devices including, for example, a smartphone, a tablet computer, a wearable apparatus, a virtual assistant, an Internet-of-Things (IoT) appliance, and/or the like. Meanwhile, the network 150 may be any wired and/or wireless network including, for example, a wide area network (WAN), a local area network (LAN), a virtual local area network (VLAN), a public land mobile network (PLMN), the Internet, and/or the like.

In some example embodiments, the integration controller 110 may be configured to integrate the first document management system 120a and the second document management system 120b including by providing a unified interface for a first user 135a accessing the first document management system 120a and a second user 135b accessing the second document management system 120b to interact with the blockchain enabled data store 140. For example, the first user 135a and the second user 135b may collaborate to generate and/or modify a document by at least interacting, respectively, with the first document management system 120a and the second document management system 120b. The integration controller 110 may include a WebAssembly (WASM) based interface for communicating with the blockchain enabled data store 140, including the various blockchain platforms included in the blockchain enabled data store 140, such that the document generated collaboratively by the first user 135a and the second user 135b may be stored in the blockchain enabled data store 140 without either the first user 135a or the second user 135b directly accessing the blockchain enabled data store 140.

Instead of directly accessing the blockchain data store 140 to modify and/or store the document, the first user 135a and the second user 135b may collaborate by interacting, respectively, with the first document management system 120a and the second document management system 120b. As such, the first user 135a and the second user 135b may not be required to be aware of the access protocols associated with any of the blockchain platforms included in the blockchain enabled data store 140. The integration controller 110 may interface with the blockchain enabled data store 140, including the various blockchain platforms included in the blockchain enabled data store 140, such that the blockchain enabled document store 140 may be accessible to the first user 135a and the second user 135b as a remote service.

Figure 2:
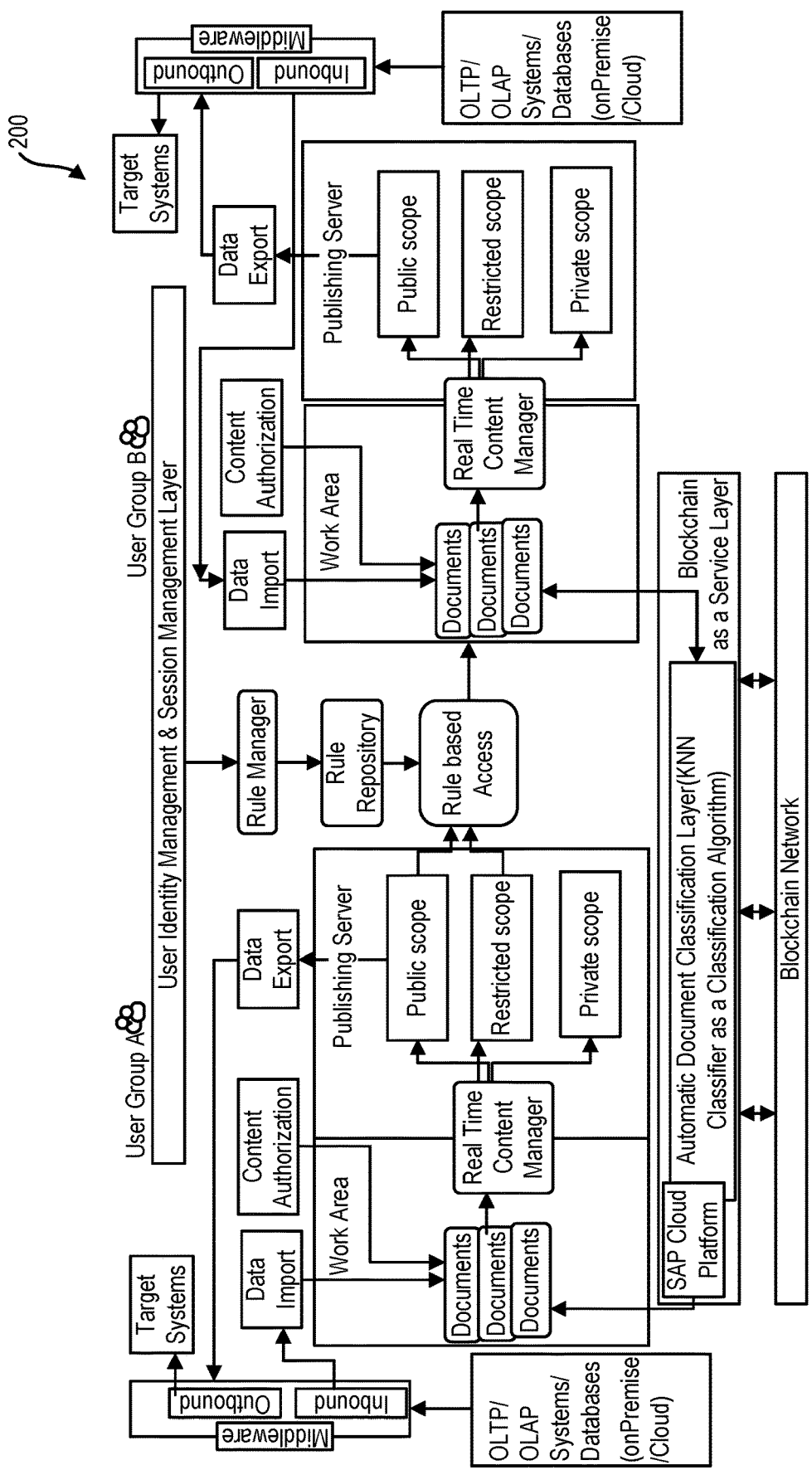
FIG. 2 depicts a block diagram illustrating an example of a framework integrating a blockchain enabled data store across multiple enterprise document management systems, in accordance with some example embodiments.

The integration controller 110 may operate to provide a framework within which the first user 135a and the second user 135b may collaborate securely across the first document management system 120a and the second document management system 120b to generate, modify, and/or store a document. FIG. 2 depicts a block diagram illustrating an example of a framework 200 integrating the blockchain enabled data store 140 across multiple enterprise document management systems including, for example, the first document management system 120a and the second document management system 120b.

As shown in FIG. 2, user requests, for example, document transaction requests from the first user 135a and/or the second user 135b, may be received via one or more interactive channels including, for example, the first client 130a, the second client 130b, and/or the like. The first client 130a and the second client 130b may be process-based devices that include, for example, personal computers, workstations, smartphones, wearable apparatuses, Internet-of-Things apparatuses, and/or the like. User credentials associated with the first user 135a and the second user 135b may be verified by an application integration layer (e.g., based on authentication tokens) before the corresponding user requests are forwarded to an identity management layer. A user request may be further process upon a successful verification of the user credentials associated with the user request. Upon a successful verification of the user credentials, the corresponding user request may be associated with a session identifier and/or a token identifier in order to enable further processing of the user request.

Referring again to FIG. 2, the session management layer may be configured to establish a user session upon identifying the user associated with a user request. The session management layer may interact with the connectivity management layer to procure the connectivity data necessary for further processing the user request. The classification layer may assign, to the user request, a priority rating based on one or more predefined criteria. Moreover, the user request may be assigned to a batch (or cluster) that corresponds to the priority associated with the user quest. An infrastructure management component included in the framework 200 may be configured to process the batches of user request by at least interacting with the blockchain enabled data store 140.

In some example embodiments, the infrastructure management component may process multiple user requests at once by executing multiple parallel transactions operating on the blockchain enabled data store 140. For example, the infrastructure management component may manage a transaction queue. Based on the quantity of transactions in the transaction queue, the publishing layer may determine the quantity of containers required to support the parallel processing of user requests assigned to different batches. Meanwhile, the infrastructure layer may determine and allocate the runtime resources (e.g., memory, processing units, threads, and/or the like) required to concurrently execute the corresponding transactions. This dynamic allocation of resources may maximize the adaptability, elasticity, scalability, and efficiency of the framework 200.

The staging layer may load a documents in queue after applying rules (e.g., user specific rules) from the rule engine and the visibility scope corresponding to the authorization rights of the user. In some example embodiments, a technical user may be created for every application user and the access rights to different application may be assigned at runtime by the staging layer using the JavaScript Object Notation (JSON) token. Access rights to the blockchain enabled data store 140 for a technical user may be assigned dynamically based on the application user rights such that the technical user has the necessary privileges to access and execute queries to access data stored in the blockchain enabled data store 140. The session identifier of the application user may be passed to the technical user in order to create a binding between the application user context and the technical user context. The application user identifier may be is passed (along with other parameters) when the technical user is querying the blockchain enabled data store 140 so that the specific results relevant to that user may be retrieved from the blockchain enabled data store 140, thereby enabling the retrieval of context specific data in the user specific layer. This may help to avoid a tight coupling between the user session and the backend system.

The infrastructure management layer may generate an individual transaction packet to include the corresponding connection details such as, for example, IP addresses, port (e.g., dynamic tunneling), and/or the like. The infrastructure management layer may be further configured to send these connection details to a network layer in the framework 200. These connection details may enable the dynamic establishment of a connection to the blockchain enabled data store 140. This connection may be associated with the requisite authorization rights. For example, authorization rights for the connection with the blockchain enabled data store 140 may be created dynamically based on the transaction context including, for example, the blockchain platform in the blockchain enabled data store 140 associated with the connection. The Infrastructure management layer may connect to the blockchain enabled data store 140, including the relevant blockchain platform, based on the connectivity details in the message header of the transaction packet.

Upon successfully establishing connectivity and transferring the document details associated with the transaction, the corresponding document may be processed by the corresponding user groups in the first document management system 120a and/or the second document management system 120b. In the event the processing document is successful, the information may be transferred to the backend system. The request may be passed to the first user 135a and/or the second user 135b, which invalidates the corresponding user session and closes the transaction session context in order to leave the remote and main databases in a mutually consistent state (if the databases are different). Moreover, the connection with the different remote systems may be closed & released before a logout confirmation is provided to the first user 135a and/or the second user 135b. It should be appreciated that a user session may also be terminated due to a lack of activity over a threshold period of time. Moreover, multiple components of the framework 200 may be configured to run within a database in order to expedite processing.

In some example embodiments, the framework 200 may protect the data from content misuse and sophisticated attacks with an extra security layer between users (e.g., the first user 135a, the second user 135b, and/or the like) and the blockchain enabled data store 140 without exposing the details of the infrastructure. Each data packet may also be uniquely encrypted using a dynamic transient key in memory, with no data stored. The framework 200 may be configured to terminate network connections from the first client 130a, the second client 130b, and/or the blockchain enabled data store 140 in response to a security breach. Moreover, the framework 200 may dynamically shift port allocations to obviate port sniffing attacks against the framework 200. In memory transactions may be implemented to prevent security breaches from accessing transient data.

The first user 135a and the second user 135b may be associated with one or more user groups (e.g., suppliers, customers, and/or the like). Data from the first document management system 120a and the second document management system 120b may be imported into the work area in order to be visible to the first user 135a and the second user 135b. The content authorization component of the framework 200 may enable each of the first user 135a and the second user 135b to create and edit the documents in the work area as well as publish the documents with varying scope of visibility such as public, restricted, private, and/or the like. The public visibility scope may provide access to all the users based on the subscription rules in the rules repository whereas the restricted visibility scope may provide access to some but not all users as stipulated by authorization profiles. The private visibility scope does not provide access to other users unless access is explicitly permitted by the owner of the document.

For example, users associated with a first user group may, upon logging into the framework 200, access documents that a second user group may have designated as public. The users associated with the first user group may also access restricted documents associated with the second user group if users from the first user group are permitted to access these restricted documents. Likewise, users from the first user group may also create, edit, and store (e.g., in the blockchain enabled data store 140) documents that have various scope of visibility such that users from the second user group may have access one or more of these documents. Based on need, each user group may import data from different document management systems and/or tenants of document management systems for collaboration. As noted, when a document is ready, a user associated with the first user group may publish the document for access, based on visibility scope, by users of the first user group and/or the second user group. It should be appreciated that publication may be required for replicating the same document across document management systems, for example, from the first document management system 120a to the second document management system 120b.

In some example embodiments, the framework 200 may include a document classification layer, which is configured to apply a machine learning model such as a clustering algorithm (e.g., k nearest neighbor) to identify a blockchain platform in the blockchain enabled data store 140 for storing a document. For example, the machine learning model may be trained to determine a category for each document and/or a priority for the corresponding transaction. The publishing server may maintain the different scope of the document. When a document is at the publishing server, the document is ready for replication, for example, to a different document management system, another tenant in the same document management system, and/or the blockchain enabled data store 140 via the data export and replication middleware. The middleware may include inbound and outbound connectivity components for exporting the document.

As noted, the integration controller 110 may operate to provide the framework 200 within which the first user 135a and the second user 135b may collaborate securely across the first document management system 120a and the second document management system 120b to generate, modify, and/or store a document. Moreover, the integration controller 110 may interface with the blockchain enabled data store 140, which may include a variety of blockchain platforms (e.g., Multichain, HyperLedger, Quorum, Ethereum, and/or the like). Referring to FIG. 2, the framework 200 may therefore include various blockchain connectors, each of which being configured to connect to a different blockchain platform. Variations in access protocols across different blockchain platforms may therefore be transparent to the first user 135a and the second user 135b, who interact with the integration controller 110 instead of the blockchain platforms.

Referring again to FIG. 2, it should be appreciated that the components of the framework 200 may deployed on premise and/or remotely. Access to the blockchain enabled data store 140 may therefore, in some instances, traverse multiple firewalls and/or networks. Nevertheless, the framework 200 may enable cross-platform collaboration to proceed in a secure manner. Additional advantages associated with the framework 200 may include improved bookkeeping, audit trail consolidation, faster clearing and settlement, ledger consolidation, operational improvements, more efficient regulatory compliance, transparency, leverage of common technical infrastructure, reduction of point-to-point communication, reduction of data replication time, reduction of landscape complexity, maximization of end user adoption, higher flexibility and scalability, minimized unnecessary data replication, unified reporting, reduction in data load across landscape, user simplicity, real time business process integration, and increased data integrity and interoperability.

Figure 3A:
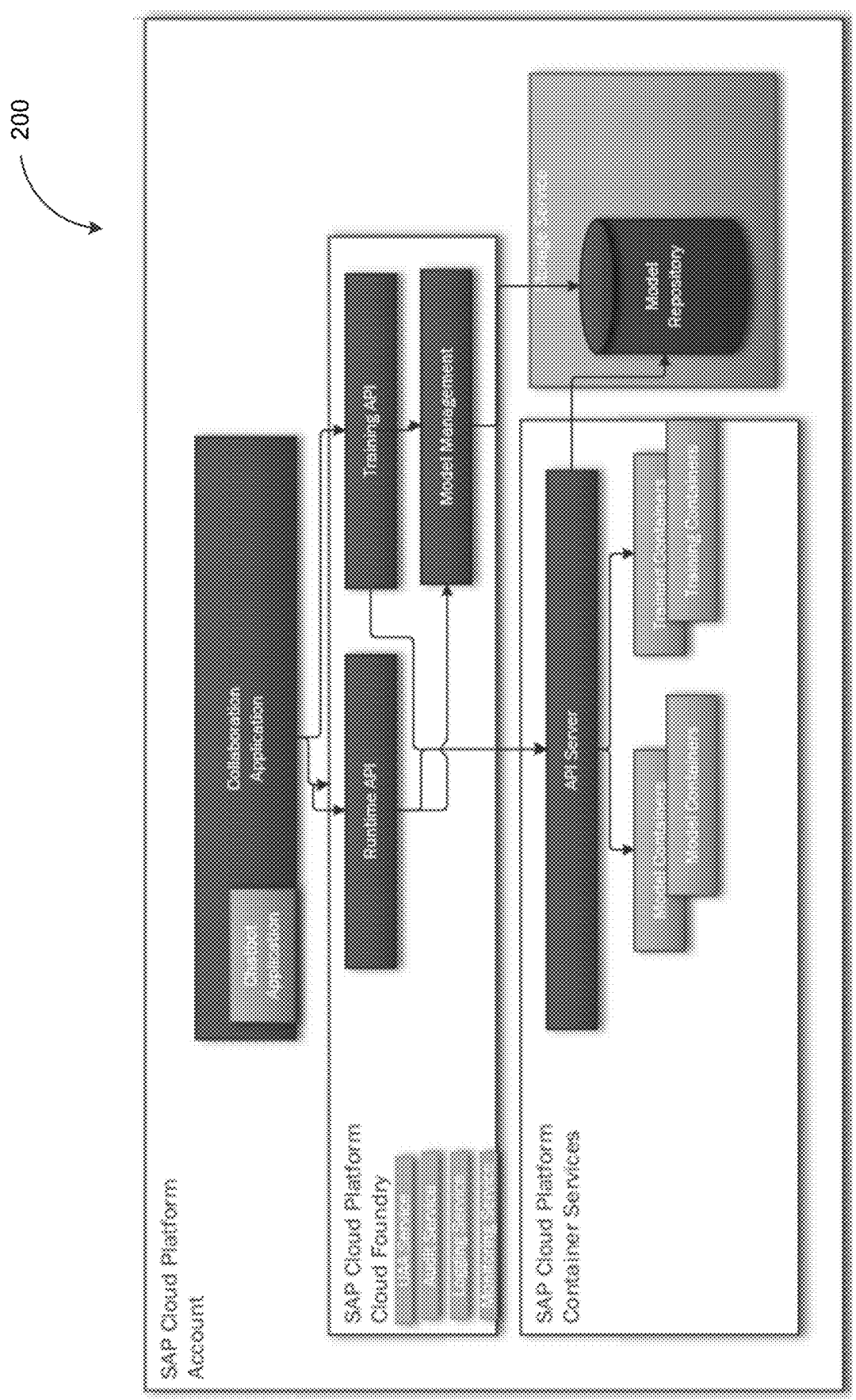
FIG. 3A depicts a block diagram illustrating an example of a framework for cross platform document collaboration, in accordance with some example embodiments.
Figure 3B:
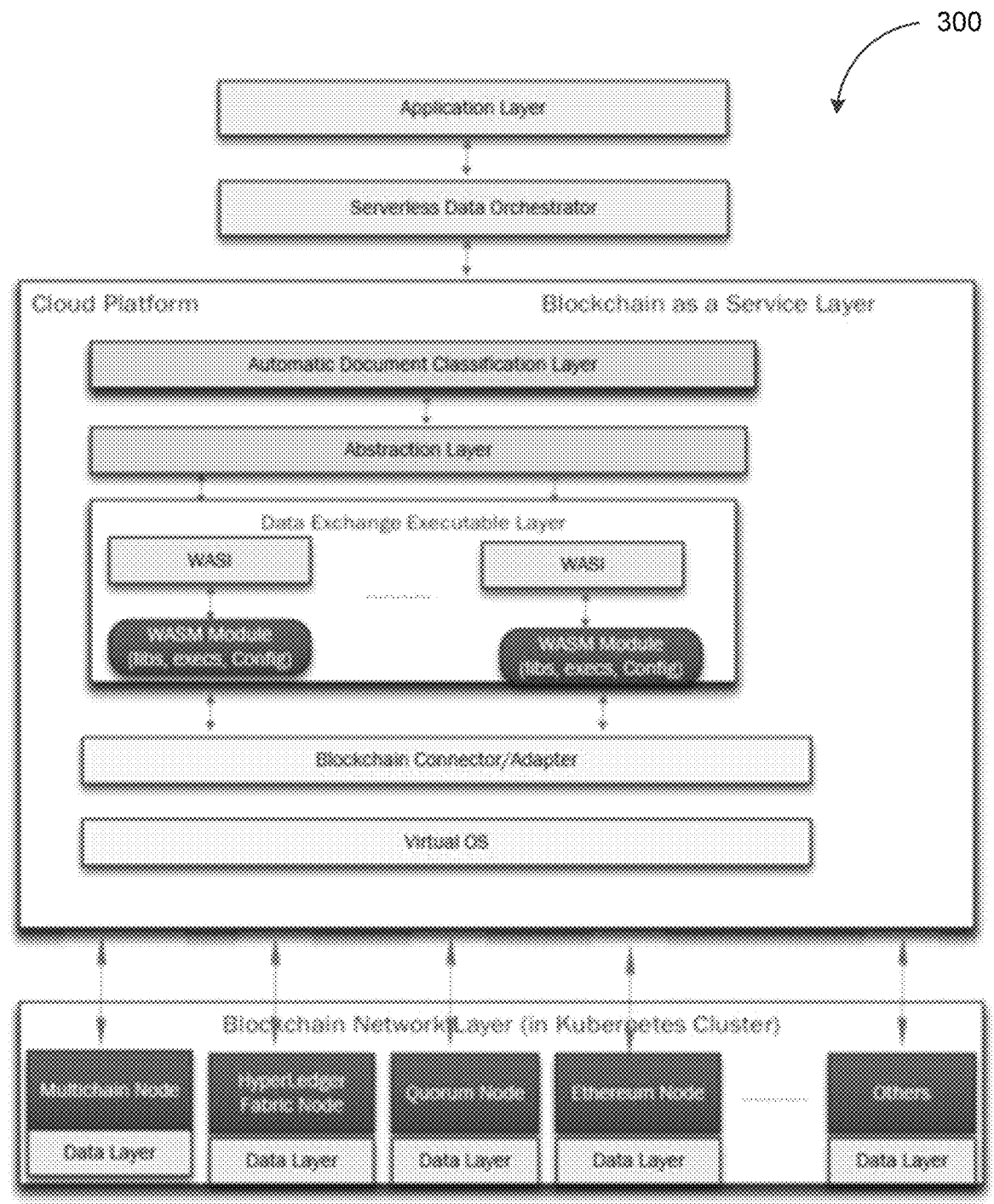
FIG. 3B depicts a block diagram illustrating an example a blockchain service layer, in accordance with some example embodiments.

As noted, user request may be assigned to a batch (or cluster) that corresponds to the priority associated with the user quest. The infrastructure management component included in the framework 200 may be configured to process the batches of user request, at least some of which in parallel, by at least interacting with the blockchain enabled data store 140. The infrastructure layer may receive a quantity of batches (clusters) to be executed in parallel. Based on the quantity of clusters, the infrastructure layer may create a corresponding quantity of containers for parallel processing the clusters. Each cluster may be processed in a separate container to avoid comingling of sensitive data and to increase data security within the framework 200. The resources (e.g., memory, processing units, threads, and/or the like) may be allocated at runtime based on need to ensure elasticity, scalability, and efficient resource while maximizing performance. Once the processing of a cluster in a container is complete, the corresponding resources may be allocated to process another container. For example, the resources may be allocated to start processing a subsequent container or allocated to supplement the existing resources for a container already undergoing processing. The infrastructure layer may sort, based on document types, different transaction batches before sending the corresponding details to a service layer configured to send data to the different blockchain platforms in the blockchain enabled data store 140. To further illustrate, FIG. 3A depicts the framework 200 including a plurality of containers for processing the clusters of user requests. FIG. 3B depicts a block diagram illustrating an example of a blockchain as a service layer 300, in accordance with some example embodiments.

Figure 3C:
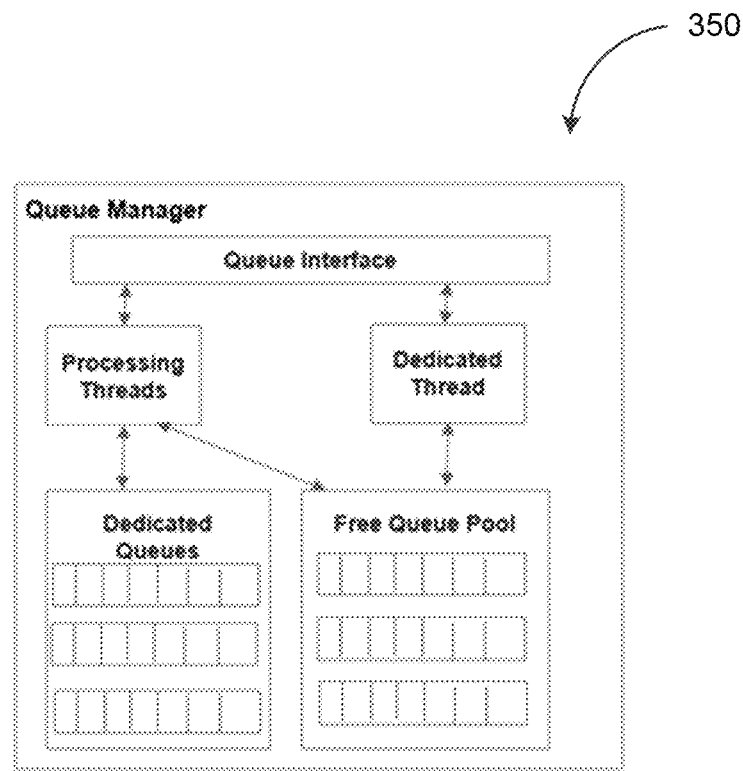
FIG. 3C depicts an example of a queue manager, in accordance with some example embodiments.

FIG. 3C depicts an example of a queue manager 350 configured to perform proactive queue allocation and batch parallelism. In some example embodiments, the queue manager 350 may include a queue interface, one or more processing threads, one or more dedicated threads, one or more dedicated queues, and a free queue pool. The processing threads may use the different queues from the dedicated queues to fulfill data processing requirements. When the processing threads reach a condition when the queues in the dedicated queues are not sufficient to fulfill the data processing requirements, the processing threads may then procure additional queues from the free queue pool.

In some example embodiments, multiple free queues may be allocated in advance for data processing based on certain thresholds. These free queues may reside in the free queue pool, which may be monitored by the dedicated thread. When the processing threads require additional free queues during processing, the processing threads may, as noted, procure additional queues from the free queue pool to avoid any performance bottlenecks during data processing. The dedicated thread may be configured to monitor the runtime and perform proactive queue allocation based on the runtime need for additional queues. The dedicated thread may also add free queues back to the free queue pool for subsequent allocation. The framework 200 may be configured to queue transaction requests in batches in a queue with other batches for processing in order to improve performance by parallelism. The batches may be processed based on the available hardware resources at various points in time.

In some example embodiments, the abstraction layer may receive documents associated with different categories (e.g., different document management systems, tenants, databases, and/or the like) and generate a corresponding data object in a generic data format such as, for example, JavaScript Object Notation (JSON) and/or the like. The data exchange executable layer may facilitate the bidirectional data exchange between different document management systems (e.g., the first document management systems 120a and the second document management system 120b) and the different blockchain platforms in the blockchain enabled data store 140. The data exchange executable layer may include different WebAssembly System Interface (WASI)

components configured to convert the data from the generic data format (e.g., JSON) to a portable binary code format such as, for example, a WebAssembly (WASM) format. Alternatively and/or additionally, the data may be converted from the portable binary code format (e.g., WebAssembly format) to the generic data format (e.g., JSON). Data in the generic data format (e.g., JSON) may be, after being converted to the portable binary code format (e.g., WebAssembly), executed within an executable layer in a multi-tenanted fashion.

As used herein, WebAssembly (WASM) may be a low-level bytecode designed as an abstraction for underlying hardware architecture. WebAssembly functions may run in isolated environment and are therefore platform agnostic. Accordingly, WebAssembly functions may be able to execute at substantially the same speed as a native function by leveraging the common hardware capabilities. A WebAssembly-based execution model may not require a container to be instantiated (avoids cold start problems) and may be executed directly on system without WebAssembly runtime support. The WebAssembly runtime may create a continuous memory heap and no pointers from outside may access the heap.

The WebAssembly runtimes may run as a separate processes, each of which executing a corresponding WebAssembly function using a thread. The WebAssembly runtime process may be provisioned on a virtual machine, a container, or a system without an operating system. The runtime may include dynamic WebAssembly loading capabilities, which may load new WebAssembly functions directly to memory without restarting the runtime process. Changes in the programming code associated with a function implemented on the database layer and/or the addition of new functions within the database layer may be complied automatically into WebAssembly modules and integrated into the runtime. Each runtime may store the WebAssembly function to application programming interface (API) mapping as key-values. Whenever a user registers a new WebAssembly function with any of the runtime, the user may execute an application programming interface (API) call. In response, the orchestrator may make another application programming interface call to the runtime to trigger the dynamic loading of the WebAssembly modules, the registration of the new WebAssembly function, and the insertion of the new application programming interface in a key-value store. Two or more WebAssembly modules may communicate via export methods and/or import methods as per the standards of the WebAssembly System Interface.

For example, the libraries json2WebAssembly may converts a JavaScript Object Notation (JSON) object to a WebAssembly module. When given a file containing a JavaScript Object Notation, executing the libraries json2WebAssembly may generate a corresponding WebAssembly module. Similarly, the libraries WebAssembly2json may convert a WebAssembly module into a JavaScript Object Notation (JSON) Object. Thus, when given a file containing a WebAssembly module, the libraries WebAssembly2json may convert the WebAssembly module to a JavaScript Object Notation object. The blockchain connector layer may include different adaptors for interacting with the different blockchain platforms in the blockchain enabled data store 140.

Different blockchain platforms may run in different containerized environment such as, for example, Kubernetes, Docker, and/or the like. Based on the type of blockchain platform, different application programming interfaces may be used to identify the blockchain platform within the blockchain enabled data store 140. For example, a corresponding block number may be determined, which in turn operates as a validation of the last block while requesting a previous hash. From the transaction data, timestamp, block number, and previous hash, a current transaction hash may be generated. The timestamp for the transactions may be maintained in the nanosecond range.

Figure 4A:
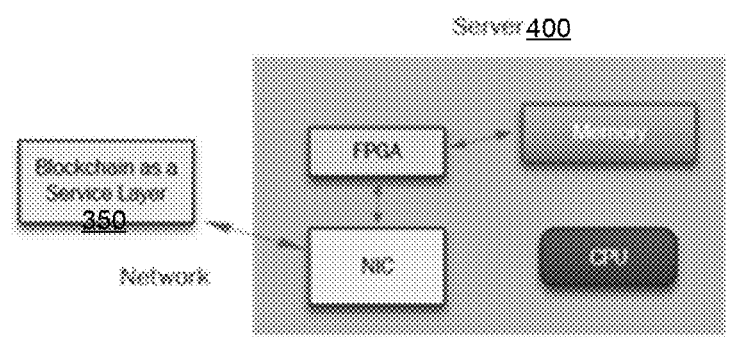
FIG. 4A depicts a block diagram illustrating an example network integration of a blockchain as a service layer, in accordance with some example embodiments.
Figure 4B:
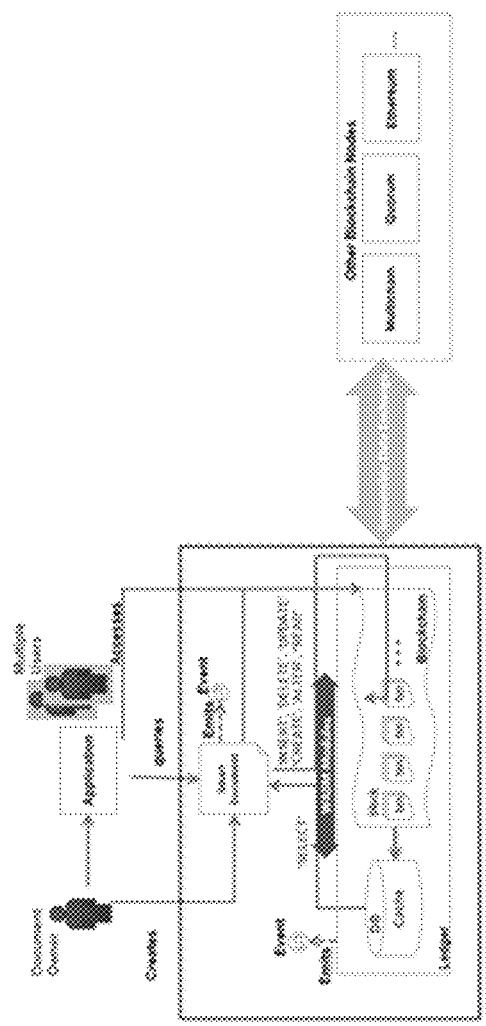
FIG. 4B depicts a block diagram illustrating an example WebAssembly data flow, in accordance with some example embodiments.

FIG. 4A depicts a block diagram illustrating an example integration of the blockchain as a service layer 350 and a server 400, in accordance with some example embodiments. The hardware configuration shown in FIG. 4A may form the infrastructure necessary to support distributed main-memory computation. Moreover, the hardware configuration shown in FIG. 4A may be reconfigurable to support accelerated workload execution.

In some example embodiments, the framework 200 may provide a variety of document processing functionalities including, for example, message queuing, data tracking, error handling, central logging, authorization management, rules management, reporting, analysis, and/or the like.

In some example embodiments, the use of WebAssembly format may enable interoperability with a variety of blockchain platforms. For example, the framework 200 may support an intermediate representation of documents using the WebAssembly format, which is platform-independent representation that is capable of dynamic compilation. In doing so, the framework 200 may serve as a low level virtual machine for the different blockchain platforms included in the blockchain enabled data store 140. Highly optimized virtual machine bytecode may be executed at substantially a same speed as native applications. As such, by serving as a low level virtual machine, the framework 200 may enable optimized performance even for remote clients. In addition to providing access to users from a variety of devices, use of the WebAssembly format may further improve user experience by minimizing download size and sandboxing the user's device against attacks launched from a webpage.

To further illustrate, the pipeline for standard WebAssembly compilation is shown below:

High level code→LLVM IR (WASM)→Native code

In some example embodiments, the first user 135a and the second user 135b may collaborate on a document. The first user 135a and/or the second user 135b may trigger, at the framework 200, different events by performing different actions with respect to the document including, for example, insert, delete, update, create, and/or the like. These actions may be logged and sent to the corresponding blockchain nodes in the blockchain enabled data store 140 using the appropriate WebAssembly modules. A database may further store various cached states, events, data and control tokens, lock states, and/or the like. Interactions between users from different user groups and the document may therefore be persisted in the database as well as the appropriate blockchain platform in the blockchain enabled data store 140.

Each WebAssembly module may support various data formats including, for example, Intermediate Document (IDocs), extensible markup language (XML), JavaScript Object Notation (JSON), Flat Files, Parquet, and/or the like. When a document is sent to the WebAssembly runtime process from a document management system, such as the first document management system 120a and/or the second document management system 120b, the corresponding data maybe mapped and transformed from one format to another format, such as WebAssembly.

In some example embodiments, the framework 200 may implement write ahead logging inside the WebAssembly runtime processes. Accordingly, changes may be first recorded in a log before being committed to the blockchain enabled data store 140, for example, in a corresponding blockchain platform. The dynamic loader may load a WebAssembly module on demand but may directly update the WebAssembly mapping table in memory to prevent a runtime process restart. Furthermore, the WebAssembly runtime may also provide static loading and speculative loading. In static loading, the runtime may load the WebAssembly modules on demand and may terminate the WebAssembly module upon completion of the request. Contrastingly, with speculative loading, one or more machine learning models (e.g., a long short term memory (LSTM) network) may be trained to predict when to load one or more WebAssembly modules based on a historical access log associated with each WebAssembly module. The WebAssembly modules may be loaded speculatively may be specified such that some WebAssembly modules may be loaded on demand and others may be loaded based on a machine learning model generated prediction.

Figure 4C:
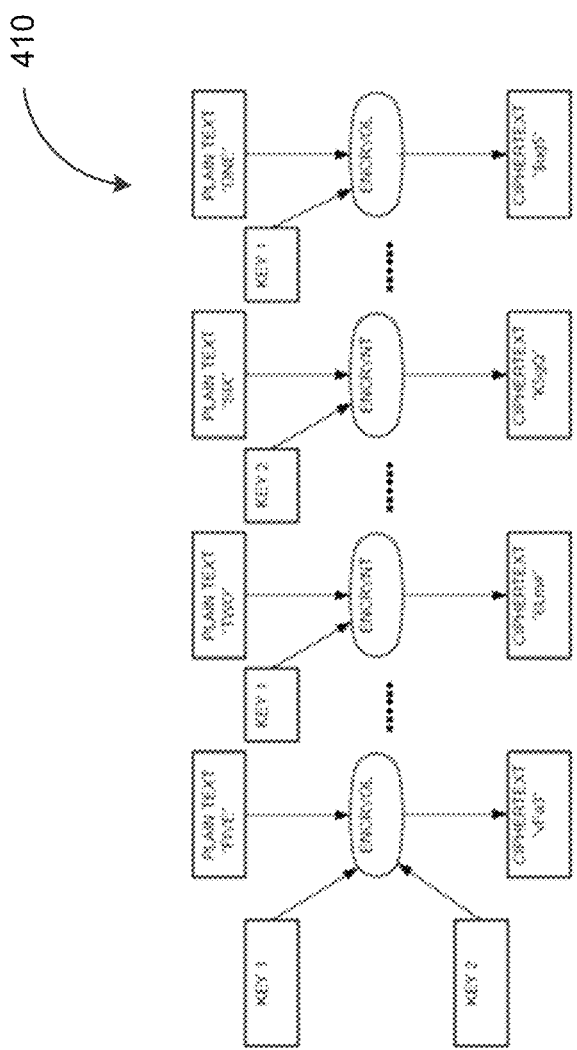
FIG. 4C depicts a block diagram illustrating an example of an encryption algorithm, in accordance with some example embodiments.

The framework 200 may be configured to encrypt the data that is sent to the blockchain enabled data store 140. FIG. 4C depicts an example of an encryption algorithm 410 that may be applied to encrypt the data sent to the blockchain enabled data store 140. In the example shown in FIG. 4C, the encryption algorithm 410 may be a sequential encryption algorithm that includes receiving multiple keys and a first word (e.g., of a document) to be encrypted, and initializing a word count to '1'. The first word, for example, "FIVE," may be encrypted "ENCRVOL" to get an encrypted word (e.g., CIPHERTEXT) "vFa3". Upon encrypting the first word, a second word (e.g., of the document) may be encrypted using encrypted first word. For instance, the second word "TWO" may be encrypted (e.g., "ENCRVNT") by using a combination of the encrypted first word and the first key to get an encrypted second word (e.g., CIPHERTEXT) "6Lm#". The process may continue until the last word in the document.

Multiple applications may be involved in exchange data with each other and that have to access some of the same data. Accordingly, the framework 200 may implement concurrency control in order to prevent multiple applications from simultaneously altering a same object. In some example embodiments, the framework 200 may implement a lock system that enforces concurrency control based on tokens. A first application and a second application that need to access the same data may compete for a token associated with the data. If the first application obtains the token instead of the second application, the first application may access the data while the data is locked to prevent the second application from also accessing the same data. Once the first application completes its access of the data, the token may be released at which point the first application and/or the second application may again compete for the token in order to gain access to the data.

Figure 4D:
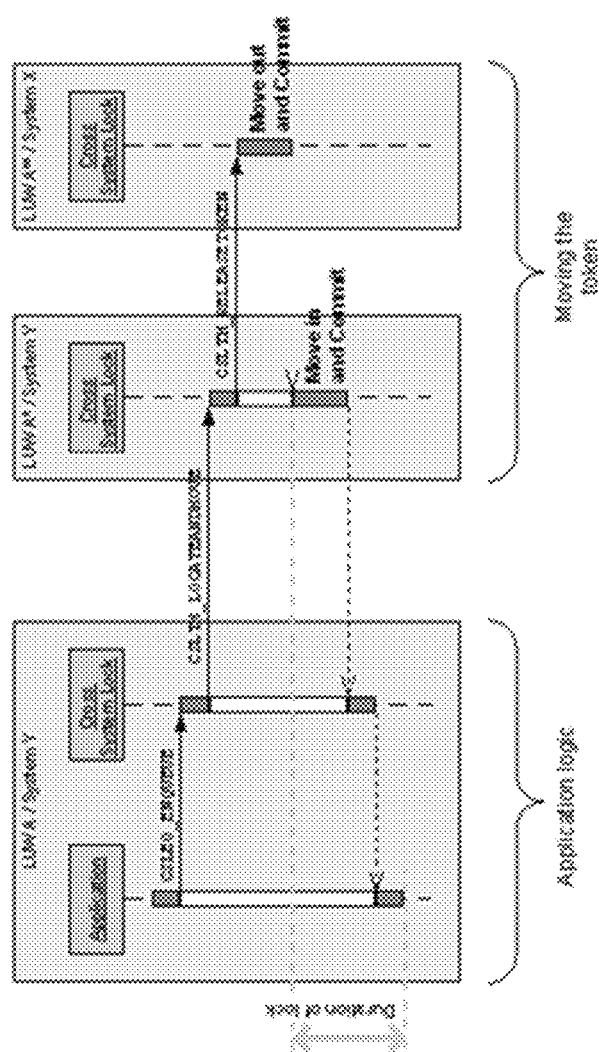
FIG. 4D depicts a sequence diagram illustrating an example of cross system locks, in accordance with some example embodiments.
Figure 4E:
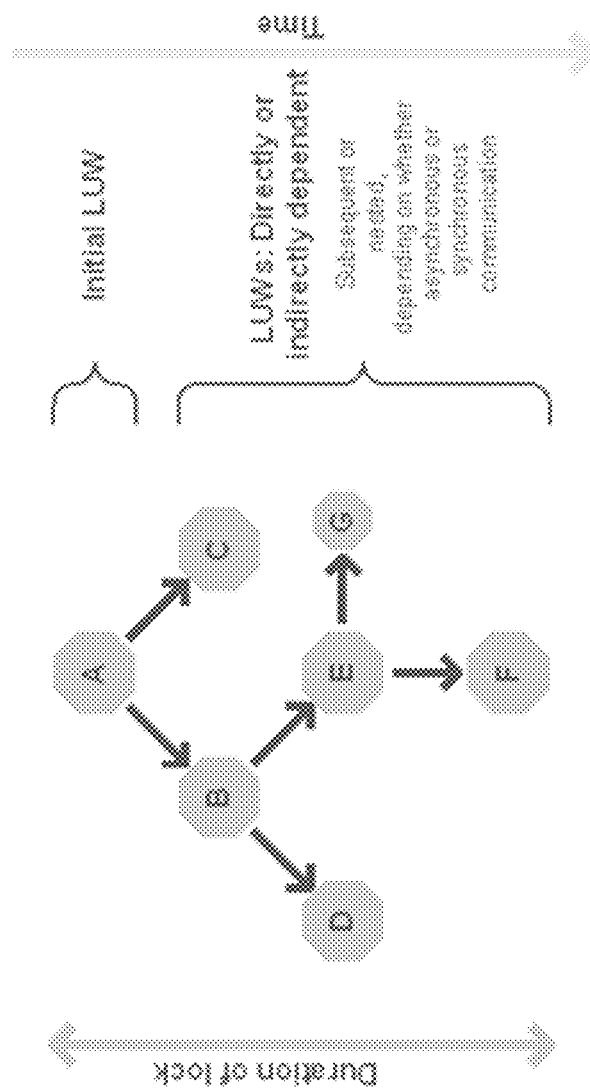
FIG. 4E depicts the duration of a lock, in accordance with some example embodiments.
Figure 4F:
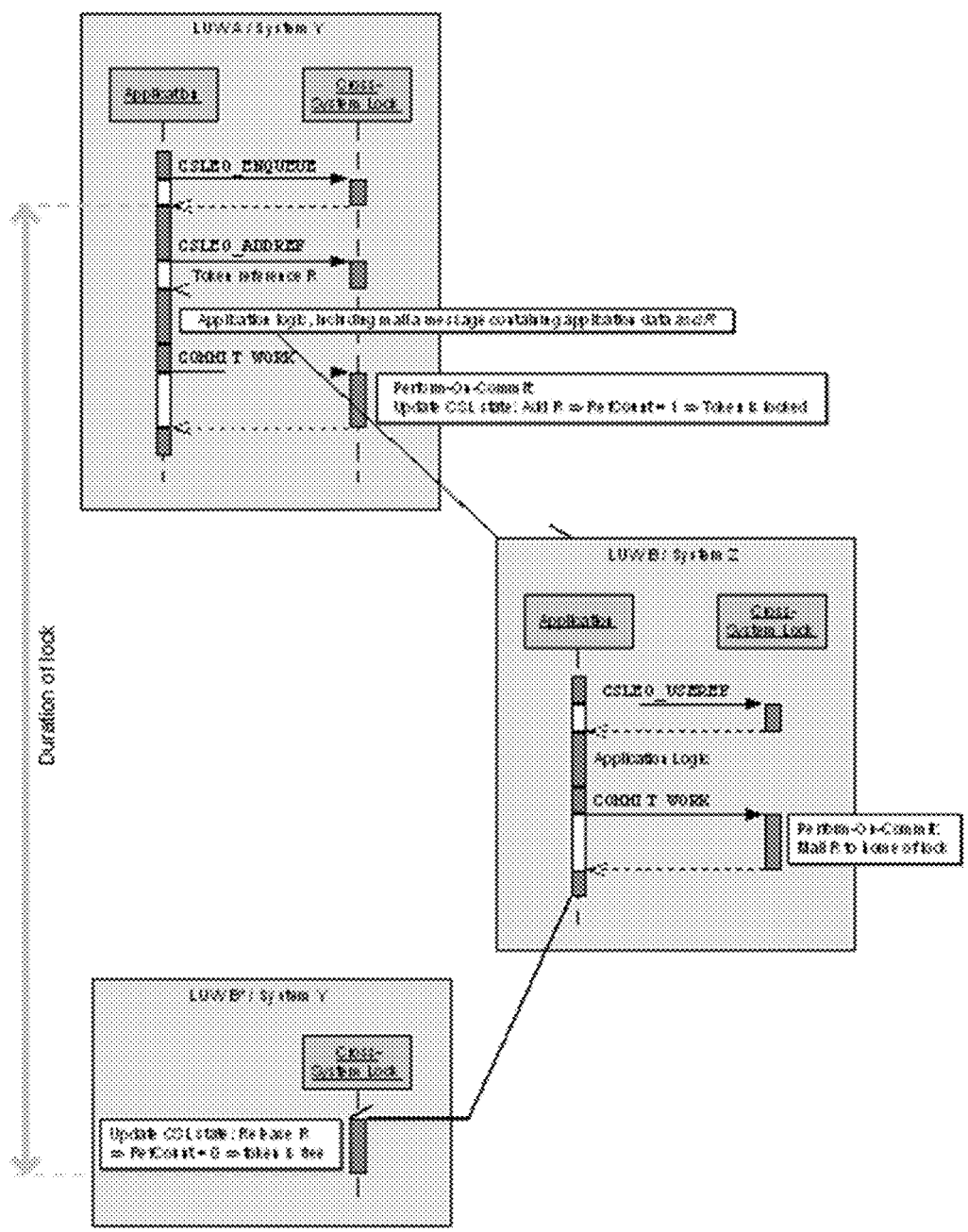
FIG. 4F depicts another example of a cross-system lock and the duration of the cross-system lock, in accordance with some example embodiments.

The lock system may include cross-system locks. To further illustrate, FIG. 4D depicts a sequence diagram illustrating an example of cross-system locks, in accordance with some example embodiments. A cross-system lock may terminate once the transaction associated with the lock completes execution. Alternatively and/or additionally, the lock system may include cross-transaction locks, which terminates when no references are associated with the token. FIG. 4E illustrates the duration of a lock, in accordance with some example embodiments. FIG. 4F depicts another example of a cross-system lock and the duration of the cross-system lock, in accordance with some example embodiments.

Figure 5:
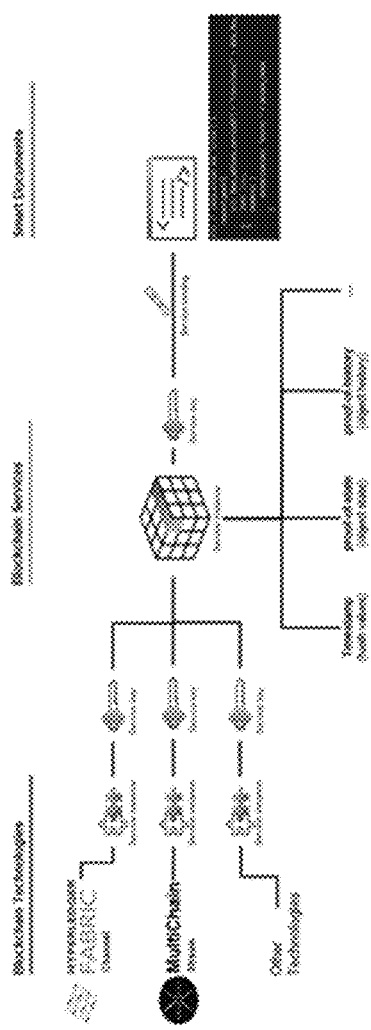
FIG. 5 depicts a block diagram illustrating the integration of document management and blockchain technologies, in accordance with some example embodiments.
Figure 6A:
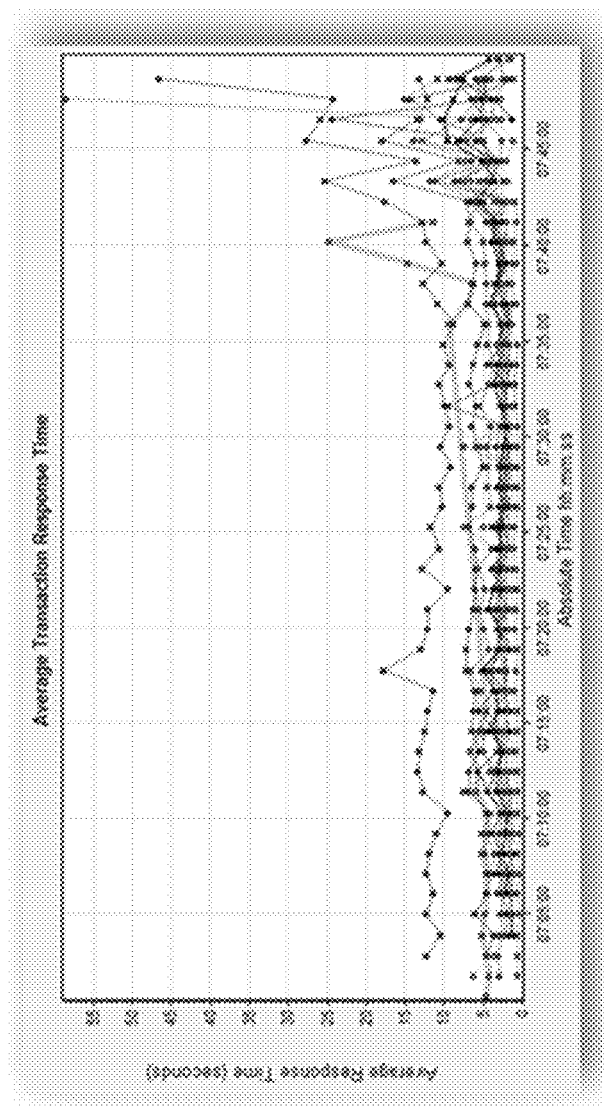
FIG. 6A depicts a graph illustrating an average transaction response time of a cross platform document management system, in accordance with some example embodiments.
Figure 6B:
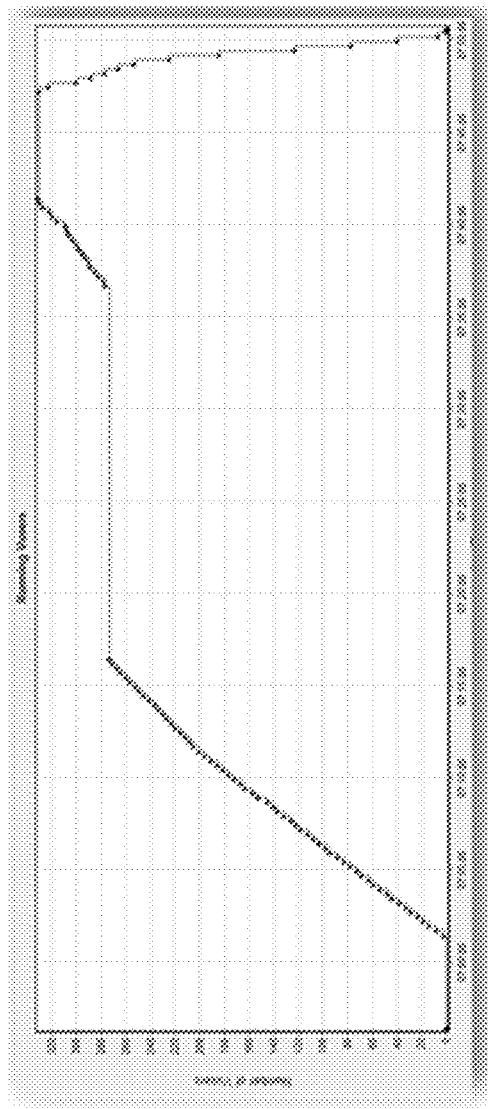
FIG. 6B depicts a graph illustrating a ramp up time and a ramp down time of a cross platform document management system, in accordance with some example embodiments.
Figure 6C:
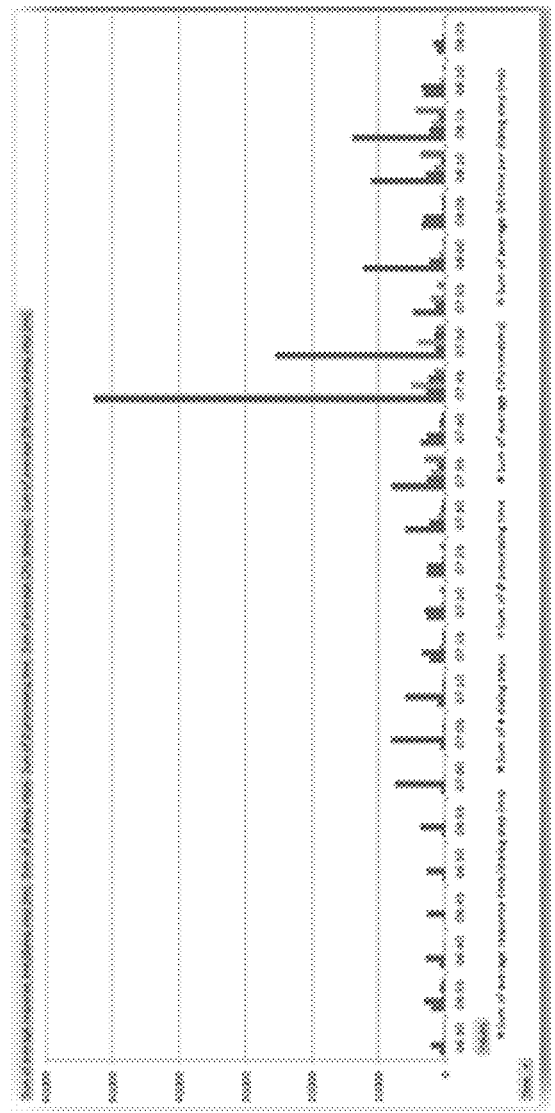
FIG. 6C depicts a graph illustrating a response time during load testing of a cross platform document management system, in accordance with some example embodiments.
Figure 6D:
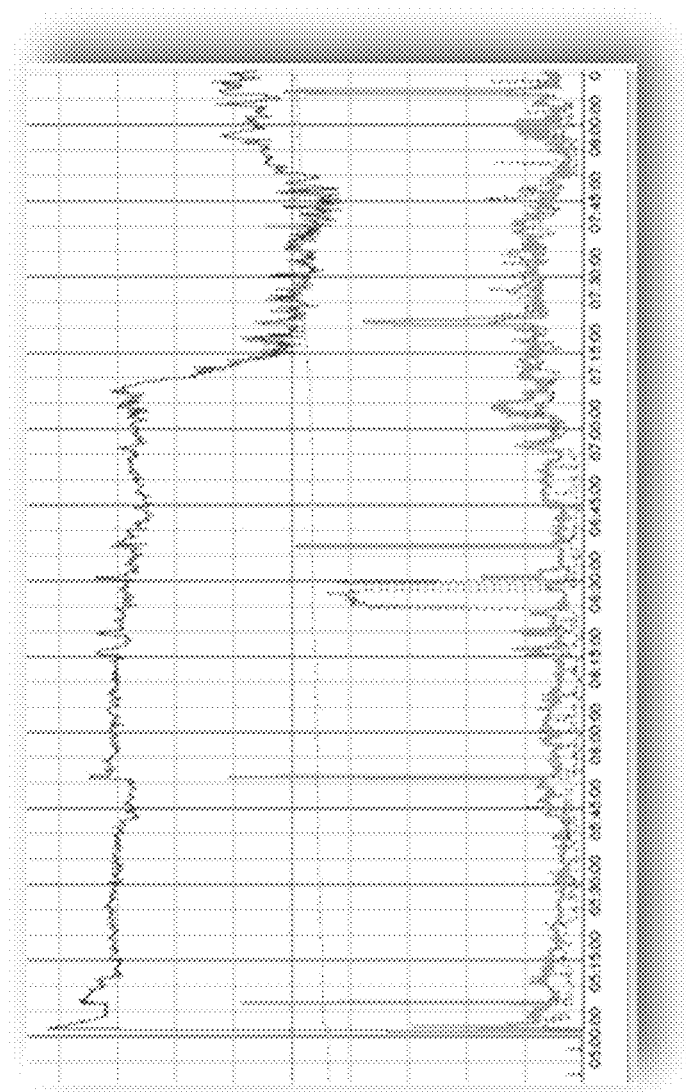
FIG. 6D depicts a graph illustrating a central processing unit consumption of a cross platform document management system, in accordance with some example embodiments.
Figure 6E:
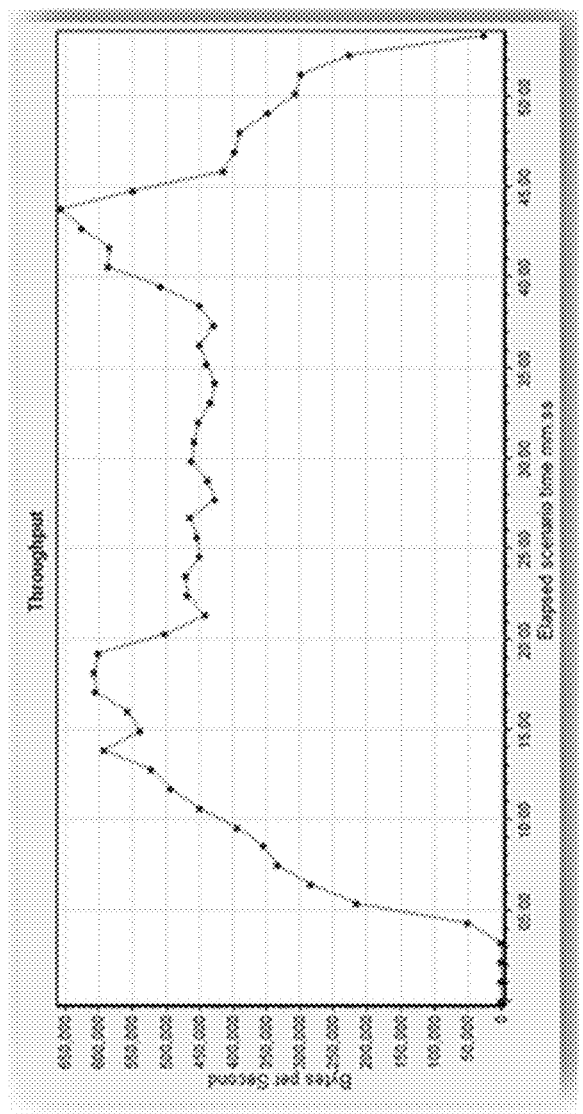
FIG. 6E depicts a graph illustrating a throughput of a cross platform document management system, in accordance with some example embodiments.
Figure 6F:
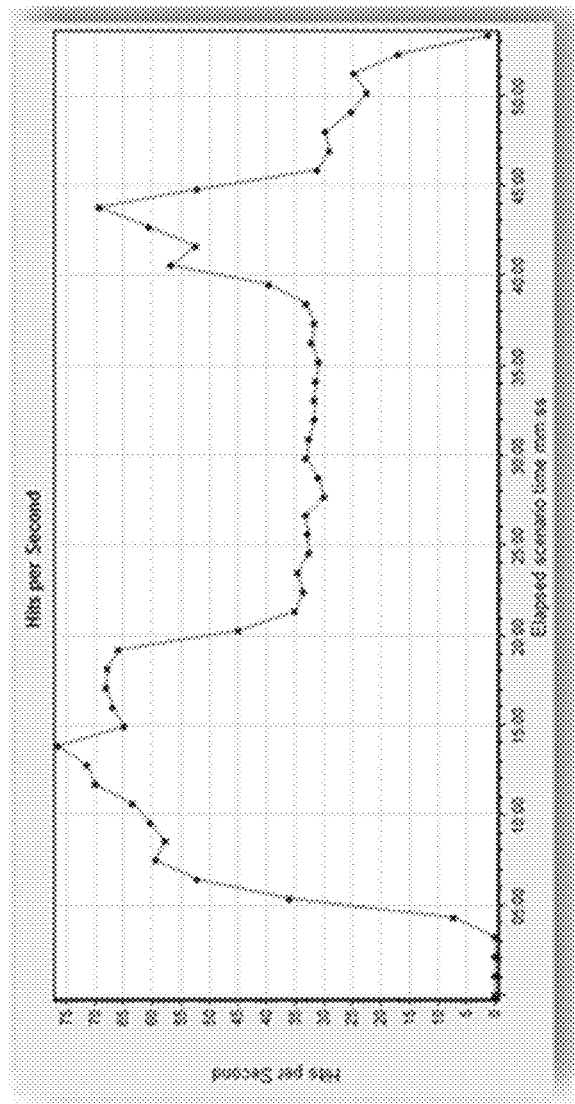
FIG. 6F depicts a graph illustrating a ramp up time and a ramp down time of a cross platform document management system, in accordance with some example embodiments.
Figure 6G:
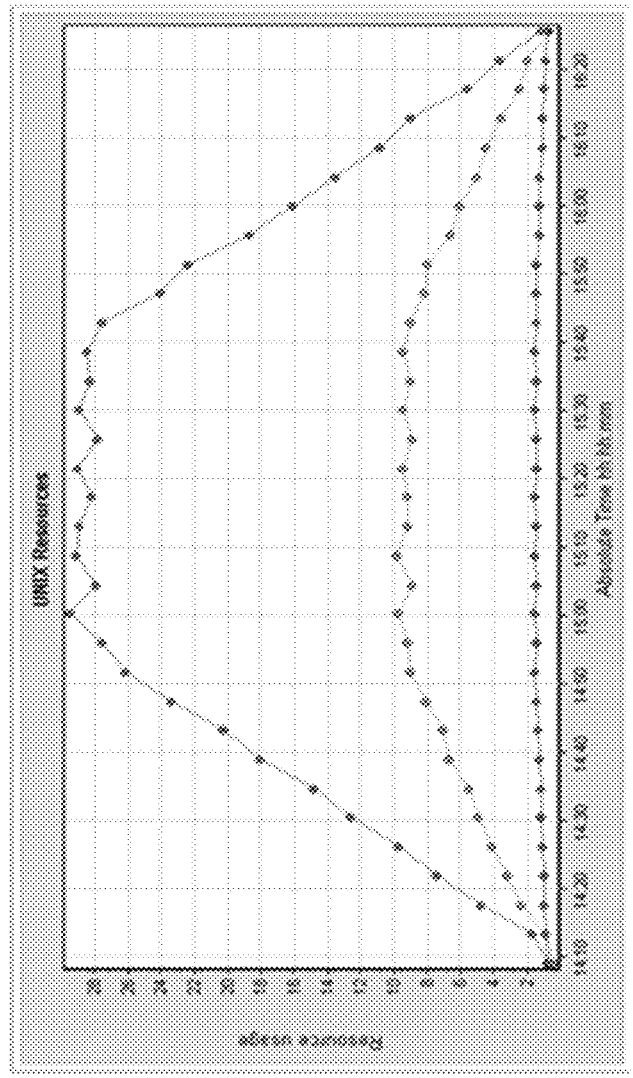
FIG. 6G depicts a graph illustrating a resource consumption of a cross platform document management system, in accordance with some example embodiments.

As noted, in some example embodiments, the integration controller 110 may integrate the first document management system 120a and the second document management system 120b including by providing a unified interface, for example, the framework 200, for a first user 135a accessing the first document management system 120a and a second user 135b accessing the second document management system 120b to interact with the blockchain enabled data store 140. In doing so, neither the first document management system 120a nor the second document management system 120b may require direct integration with one or more of the blockchain platforms included in the blockchain enabled data store 140. FIG. 5 depicts a block diagram illustrating this integration. Moreover, the framework 200 may provide various performance enhancements, as shown in FIGS. 6A-G.

Figure 7:
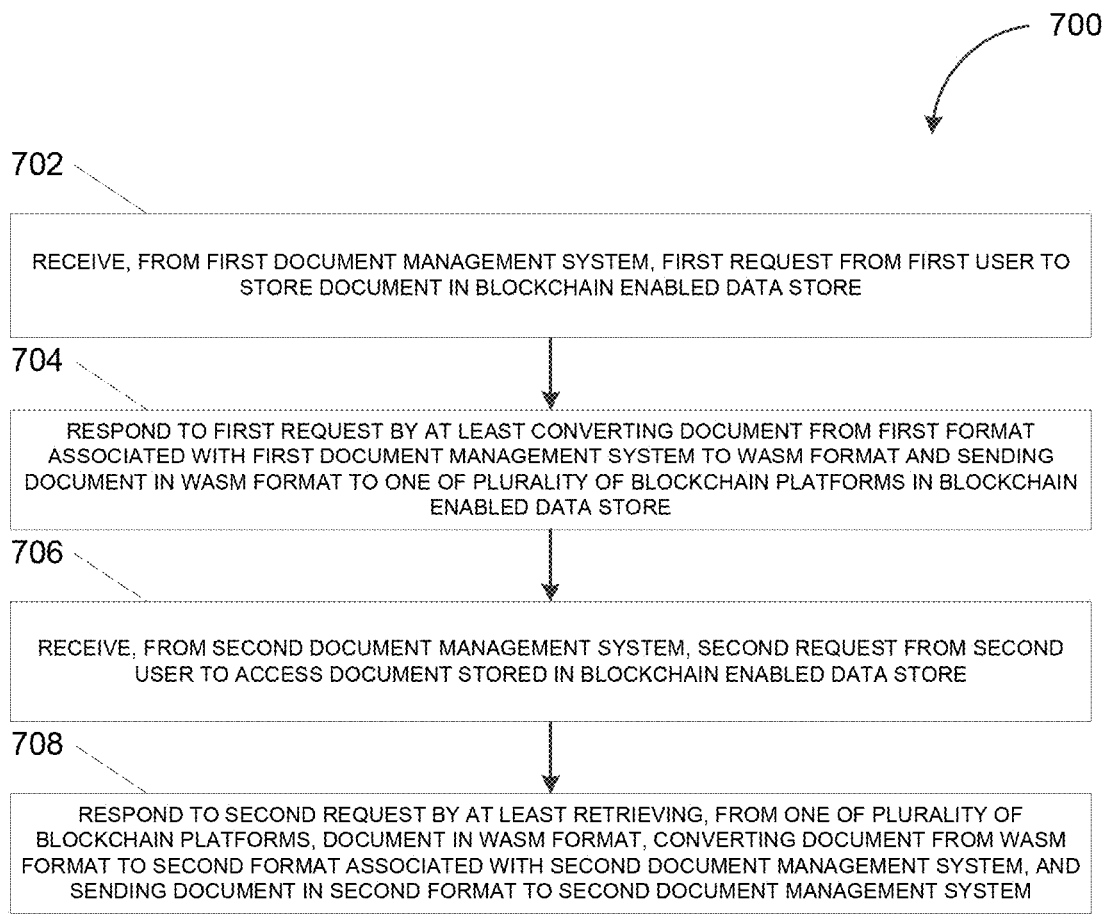
FIG. 7 depicts a flowchart illustrating an example of a process for integrated access to a blockchain enabled data store, in accordance with some example embodiments.

FIG. 7 depicts a flowchart illustrating an example of a process 700 for integrated access to a blockchain enabled data store, in accordance with some example embodiments. Referring to FIGS. 1-7, the process 700 may be performed by the integration controller 110 in order to provide integrated access between the first document management system 120a, the second document management 120b, and the blockchain enabled data store 140.

At 702, the integration controller 110 may receive, from a first document management system, a first request from a first user to store a document in the blockchain enabled data store 140. For example, the first user 135a may interact, via the first client 120a, with the first document management system 120a in order to generate a document. The first user 135a may send, to the first document management system 120a, a request to save the document at the blockchain enabled data store 140.

At 704, the integration controller 110 may respond to the first request by at least converting the document from a first format associated with the first document management system into a WebAssembly format and sending the document in the WebAssembly format to one of a plurality of blockchain platforms included in the blockchain enabled data store 140. In some example embodiments, the integration controller 110 may interface with the blockchain enabled data store 140. As such, the integration controller 110 may respond to the request from the first user 135a by at least interacting with the blockchain enabled data store 140 to store the document. For example, the integration controller 110 may convert the document from a format associated with the first document management system 120a to a WebAssembly format. Moreover, the integration controller 110 may identify, for example, by applying a machine learning model, a blockchain platform in the blockchain enabled data store 140 for storing the document.

At 706, the integration controller 110 may receive, from a second document management system, a second request from a second user to access the document stored in the blockchain enabled data store 140. For example, the second user 135b may be collaborating with the first user 135a on the document. The second user 135b may be associated with the second document management system 120b and not the first document management system 120a. Nevertheless, the second user 135b may access the document by interacting, via the second client 130b, with the second document management system 120b. For example, the second user 135b may send, to the second document management system 120b, a request to retrieve the document from the blockchain enabled data store 140.

At 708, the integration controller 110 may respond to the second request by at least retrieving, from the one of the plurality of blockchain platforms at the blockchain enabled data store 140, the document in the WebAssembly format, converting the document from the WebAssembly format to a second format associated with the second document management system, and sending the document in the second format to the second document management system. In some example embodiments, the integration controller 110 may provide a unified interface for the first user 135a accessing the first document management system 120a and the second user 135b accessing the second document management system 120b to interact with the blockchain enabled data store 140 and access the document. Accordingly, the integration controller 110 may respond to the request from the second user 135b by at least identifying the blockchain platform in the blockchain enabled data store 140 at which the document is stored. Moreover, upon retrieving the document from the blockchain enabled data store 140, the integration controller 110 may convert the document from the WebAssembly format to a format associated with the second document management system 120b before sending the document to the second document management system 120b.

In some example embodiments, when responding to the first request and the second request, the integration controller 110 may be configured to encrypt at least a portion of the data being exchanged with the blockchain enabled data store 140. Moreover, the integration controller 110 may implement a lock system in order to manage concurrent access to the same document in the blockchain enabled data store 140.

Figure 8:
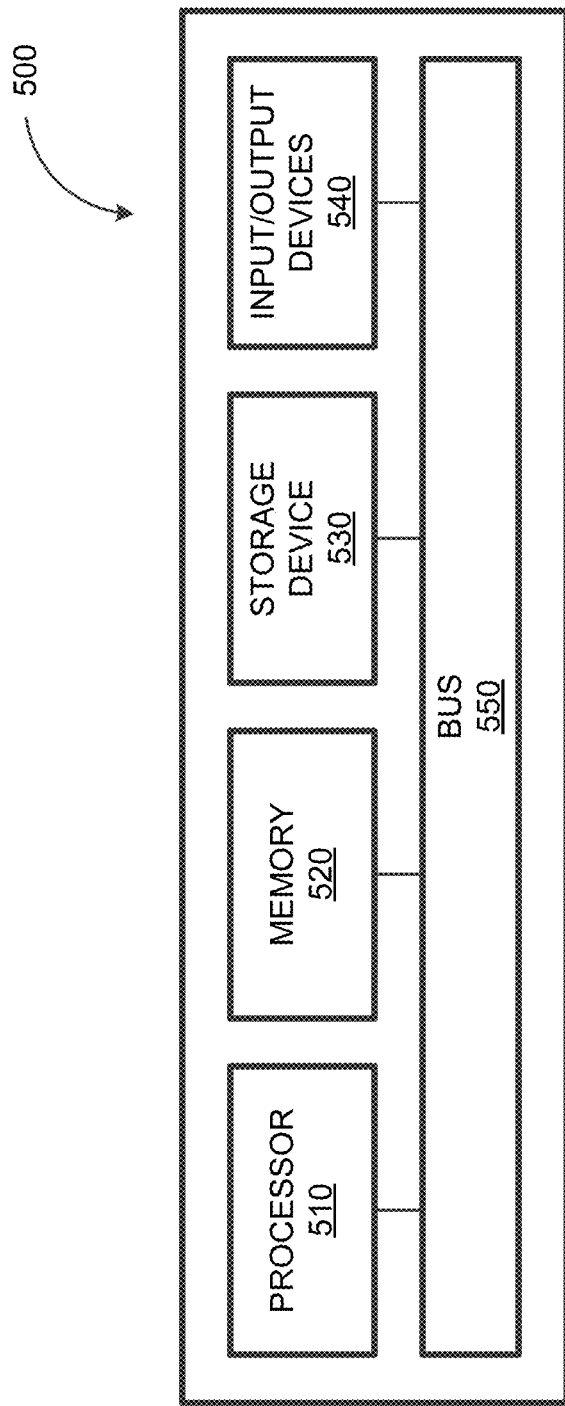
FIG. 8 depicts a block diagram illustrating a computing system, in accordance with some example embodiments.

FIG. 8 depicts a block diagram illustrating a computing system 500 consistent with implementations of the current subject matter. Referring to FIGS. 1-8, the computing system 500 can be used to implement the integration controller 110 and/or any components therein.

As shown in FIG. 8, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the integration controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a first document management system, a first request to store a document in a blockchain enabled data store including a plurality of blockchain platforms;
   responding to the first request by at least applying a machine learning model trained to identify, based at least on the document, one of the plurality of blockchain platforms corresponding to the document, converting the document from a first format associated with the first document management system to a portable binary code format and sending the document in the portable binary code format to the one of the plurality of blockchain platforms;
   receiving, from a second document management system, a second request to access the document stored in the blockchain enabled data store; and
   responding to the second request by at least retrieving, from the one of the plurality of blockchain platforms, the document in the portable binary code format, converting the document from the portable binary code format to a second format associated with the second document management system, and sending the document in the second format to the second document management system.

2. The system of claim 1, wherein the first format and the second format comprise Intermediate Document, extensible markup language, JavaScript Object Notation, Flat Files, or Parquet.

3. The system of claim 1, wherein the machine learning model comprises a clustering algorithm.

4. The system of claim 1, further comprising:
   receiving a third request to access the document stored in the blockchain enabled data store;
   responding to the third request by at least determining whether the third request has obtained a token associated with the document; and
   delaying an execution of the third request in response to determining that the second request has obtained the token associated with the document.

5. The system of claim 1, further comprising:
   retrieving, from the one of the plurality of blockchain platforms, the document in the portable binary code format based at least on a likelihood of a third request requesting to access the document.

6. The system of claim 5, wherein the likelihood of the third request requesting to access the document may be determined by applying a machine learning model trained to predict, based at least on a historical access log associated with the document, when to retrieve the document from the one of the plurality of blockchain platforms.

7. The system of claim 6, wherein the machine learning model comprises a long short term memory network.

8. The system of claim 1, further comprising:
   encrypting the document in the portable binary code format prior to sending the document to the one of the plurality of blockchain platforms.

9. The system of claim 1, further comprising:
   encrypting the document in the second format prior to sending the document in the second format to the second document management system.

10. The system of claim 1, wherein the conversion to and/or from the portable binary code format is performed by a blockchain as a service layer configured to provide in-network processing by at least communicating with a network interface controller and/or a field programmable gate array.

11. The system of claim 1, wherein responding to the first request and the second request includes determining a data priority and a network bandwidth priority for each of the first request and the second request.

12. The system of claim 1, further comprising:
assigning, to a first batch, the first request and/or the second request;
assigning, to a first queue, the first batch; and
processing, by a first processing thread, the first queue including the first batch, the first processing thread processing the first queue by at least responding to the first request and/or the second request included in the first batch.

13. The system of claim 12, wherein the first batch is assigned to the first queue based at least on a first priority associated with the first request and/or the second, and wherein a second batch is assigned to a second queue based at least on a second priority associated with a third request included in the second batch.

14. The system of claim 13, further comprising:
processing, by a second processing thread, the second queue including the third batch, the first processing thread processing the first queue and the second processing thread processing the second thread in parallel.

15. The system of claim 12, further comprising:
allocating, from a pool of free queues, a second queue for processing the first batch in response to determining that the first batch is associated with insufficient resources for processing the first batch.

16. The system of claim 15, further comprising:
allocating one or more resources for the second queue, the one or more resources including a memory, a processing unit, and/or a thread.

17. The system of claim 1, wherein the portable binary code format comprises a WebAssembly format.

18. A method, comprising:
receiving, from a first document management system, a first request to store a document in a blockchain enabled data store including a plurality of blockchain platforms;
responding to the first request by at least applying a machine learning model trained to identify, based at least on the document, one of the plurality of blockchain platforms corresponding to the document, converting the document from a first format associated with the first document management system to a portable binary code format, and sending the document in the portable binary code format to the one of the plurality of blockchain platforms;
receiving, from a second document management system, a second request to access the document stored in the blockchain enabled data store; and
responding to the second request by at least retrieving, from the one of the plurality of blockchain platforms, the document in the portable binary code format, converting the document from the portable binary code format to a second format associated with the second document management system, and sending the document in the second format to the second document management system.

19. A non-transitory computer readable medium storing instructions, which when executed by at least one data processor, result in operations comprising:
receiving, from a first document management system, a first request to store a document in a blockchain enabled data store including a plurality of blockchain platforms;
responding to the first request by at least applying a machine learning model trained to identify, based at least on the document, one of the plurality of blockchain platforms corresponding to the document, converting the document from a first format associated with the first document management system to a portable binary code format, and sending the document in the portable binary code format to the one of the plurality of blockchain platforms;
receiving, from a second document management system, a second request to access the document stored in the blockchain enabled data store; and
responding to the second request by at least retrieving, from the one of the plurality of blockchain platforms, the document in the portable binary code format, converting the document from the portable binary code format to a second format associated with the second document management system, and sending the document in the second format to the second document management system.

* * * * *